(12) United States Patent
Lee et al.

(10) Patent No.: US 11,026,773 B2
(45) Date of Patent: Jun. 8, 2021

(54) ANIMAL SUPPORTING DEVICE

(71) Applicants: Timothy Joseph Lee, Springfield, VA (US); Dede Jan Croy, Fort Worth, TX (US)

(72) Inventors: Timothy Joseph Lee, Springfield, VA (US); Dede Jan Croy, Fort Worth, TX (US)

(73) Assignee: MY FAVORITE GROOMER, Fort Worth, TX (US)

( * ) Notice: Subject to any disclaimer, the term of this patent is extended or adjusted under 35 U.S.C. 154(b) by 324 days.

(21) Appl. No.: 16/144,874

(22) Filed: Sep. 27, 2018

(65) Prior Publication Data

US 2020/0100882 A1  Apr. 2, 2020

(51) Int. Cl.
*A61D 3/00* (2006.01)
*A01K 1/06* (2006.01)
*A01K 13/00* (2006.01)

(52) U.S. Cl.
CPC .............. *A61D 3/00* (2013.01); *A01K 1/0613* (2013.01); *A01K 13/00* (2013.01)

(58) Field of Classification Search
CPC ................ A61D 3/00; A61D 2003/003; A61D 2003/006
USPC .......................... 119/712, 725, 726, 905, 174
See application file for complete search history.

(56) References Cited

U.S. PATENT DOCUMENTS

| | | | |
|---|---|---|---|
| 3,092,079 A | 6/1963 | Strebel | |
| 3,120,836 A | 2/1964 | Brauning | |
| 3,250,252 A | 5/1966 | Seymour | |
| 3,524,434 A | 8/1970 | Finley | |
| 3,580,222 A * | 5/1971 | Dunn | A01K 13/00 119/725 |
| 3,744,457 A | 7/1973 | Heine | |
| 4,003,341 A | 1/1977 | La Croix | |
| D321,562 S * | 11/1991 | Ljungvall | D24/183 |
| D349,541 S * | 8/1994 | Bertolucci | D21/686 |
| 6,325,154 B1 | 12/2001 | Keeler | |
| 6,640,905 B2 | 11/2003 | Keeler | |
| 6,848,512 B2 | 2/2005 | Keeler | |
| 7,334,643 B2 | 2/2008 | Keeler | |
| 7,824,319 B2 * | 11/2010 | Carlesimo | A63B 26/00 482/141 |
| D639,876 S * | 6/2011 | Tsou | D21/686 |
| 8,607,740 B2 * | 12/2013 | Webb | A01K 1/0236 119/725 |
| D779,601 S * | 2/2017 | Scholder | A63B 21/4039 D21/686 |
| 9,925,408 B1 * | 3/2018 | Murdock | A63B 23/12 |
| D823,404 S * | 7/2018 | Razon | D21/688 |
| D872,199 S * | 1/2020 | Krishock | D21/686 |
| D880,628 S * | 4/2020 | McHenry | D21/686 |
| 2009/0192028 A1 * | 7/2009 | Shank | A63B 26/00 482/148 |
| 2012/0214653 A1 | 8/2012 | Tsou | |

(Continued)

*Primary Examiner* — Richard T Price, Jr.

(57) ABSTRACT

An animal supporting device having a having three primary dimensions of unequal lengths for engaging the abdomen or other body part of an animal at various support elevations. The device may have one or more trough-shaped channels for engaging the abdomen or other body part of the animal at alternative support elevations. The device may have a dog-bone-shaped outline. Other embodiments are described and shown.

16 Claims, 5 Drawing Sheets

(56) References Cited

U.S. PATENT DOCUMENTS

| | | | |
|---|---|---|---|
| 2013/0190151 A1* | 7/2013 | Scholder | A63B 21/4039 |
| | | | 482/142 |
| 2018/0325081 A1* | 11/2018 | Lee | F16M 11/10 |
| 2019/0239482 A1* | 8/2019 | Peacock Gallagher | A61D 7/00 |

* cited by examiner

ANIMAL SUPPORTING DEVICE

BACKGROUND

Prior Art

The following is a tabulation of some prior art that presently appears relevant:

| U.S. Patents | | | |
|---|---|---|---|
| Pat. No. | Kind Code | Issue Date | Patentee |
| 3,120,836 | A | 1961 Sep. 27 | Brauning |
| 3,250,252 | A | 1966 May 10 | Seymour |
| 6,325,154 | B1 | 2001 Dec. 4 | Keeler |
| 6,640,905 | B2 | 2003 Nov. 4 | Keeler |
| 6,848,512 | B2 | 2005 Feb. 1 | Keeler |
| 7,334,643 | B2 | 2008 Feb. 26 | Keeler |

Dog grooming and veterinarian examination tables typically feature a tethered loop that can be placed around a dog's neck to prevent it from moving about the table while being groomed or treated. However, dogs often insist on sitting down, which can make the grooming or medical treatment process difficult and time consuming for the groomer, owner, veterinarian, or technician. Additionally, dogs that are elderly, injured, or otherwise disabled can have difficulty supporting themselves for long periods of time.

While the tethered loop restricts the dog's movement to some degree, it does nothing to prevent the dog from sitting down. Therefore, groomers often physically support the dog with one hand and groom with the other hand, which increases hand, wrist, and arm fatigue and can cause long-term health issues. Veterinarians, breeders, and other animal care professionals may also have similar issues when treating dogs and other animals, where sitting limits access to a significant portion of the animal for evaluation or treatment. Furthermore, bathing dogs or other animals that sit or cannot stand can also be a challenge.

Additionally, smaller dogs such as Yorkshire Terriers, Chihuahuas, Dachshunds, puppies, and so-called "toy" breeds have abdomens that are relatively close to the surface that they are standing on. Therefore, support stands that can accommodate such smaller animals may have a very limited height range and may be difficult to use due to the limited clearance under the animal.

In U.S. Pat. No. 3,120,836 (1961), Brauning discloses a dog treatment table comprising an adjustable-height saddle and an overhead neck restraint that attaches to a dog's collar for the purpose of immobilizing the dog being treated. The horizontal saddle comprises a concave surface for engaging the abdomen of the dog and a strap means to releasably secure the dog to the saddle. The neck restraint comprises a vertical support, an L-shaped rod received therein, and a flexible line that attaches to the collar.

In U.S. Pat. No. 3,250,252 (1966), Seymour discloses a portable animal restraining apparatus comprising vertically adjustable forward and rearward frame supports with narrow and rigid U-shaped body-restraining cradles for engaging beneath and at the sides of the animal's body. The cradles are vertically adjustable, and the connection means joining the forward and rearward frame supports is longitudinally adjustable.

In U.S. Pat. Nos. 6,325,154 (2001), 6,640,905 (2003), 6,848,512 (2005), and 7,334,643 (2008), Keeler discloses various embodiments of an adjustable horseowner and farrier's stand and an adjustable stand for the care of an animal with a base, an adjustable upright, and a cradle comprising a web, two upending arms, and a cushioning material or strap extending between the arms and above the web for receiving a horse's foot or another animal body part. The various embodiments also include other features for noise reduction and shock absorption.

While functional for supporting animals, the prior-art devices have many disadvantages. Particularly, the prior-art devices that have the cradle support integrated into or attached to the table (Brauning) may require specialized tables or customized hardware to be manufactured and marketed, which the inventors believe may be cost prohibitive and functionally limiting for many groomers and pet owners. Additionally, facilities with multiple grooming or examination tables may require several of these devices such that all of the tables can utilize the supporting feature as needed. The inventors also believe that these devices cannot effectively be used in a tub for bathing. Furthermore, since the inventors have found that some animals may not require support for a portion or the entire duration of the groom, exam, or treatment, the inventors believe that permanently and detachably mounted devices of the prior art may not be sufficiently quick or easy to install or remove, particularly while the animal is on the table, and may require working around the device or additional time to install or remove the device as needed. Lastly, the inventors believe that the required strap and the high sides of the saddle may obstruct access to the animal being treated.

Portable support stands offer greater flexibility than those that are mounted into a table since they can be moved or removed as needed. While standalone prior-art stands exist (Seymour and Keeler), the inventors believe that none are suitable or practical for supporting the underside of a small animal or to prevent it from sitting while being groomed, bathed, or treated. First, the inventors believe that the adjustable posts of these stands may be limited in height range. More specifically, the inventors have found that the height range is generally limited by the minimum height of the stand, such that the maximum height is no more than twice the minimum height; the inventors have found that this results in a limited height range for stands that can accommodate smaller animals. Additionally, the inventors believe that even if shorter support stands were made to accommodate smaller animals, the height adjustment of these stands may be difficult due to the limited clearance beneath the abdomens of smaller animals. Furthermore, the inventors have found that the adjustment of these support stands generally requires the use of two hands, which can reduce productivity if tools need to be put down in order to adjust the stand or support the animal. Lastly, these devices have multiple parts, which the inventors believe increases production costs and complexity.

What is needed is a simple device that supports the underside of a small animal while it is being groomed, bathed, or treated. What is still needed is an easily adjustable and portable supporting device that can effectively prevent a small animal from sitting down during grooming, bathing, breeding, and veterinary care.

Advantages

Accordingly, several advantages of one or more aspects are as follows: to provide a supporting device that is standalone and portable; that can be quickly and easily placed under an animal or removed as needed; that can be repositioned easily; that can be used on a variety of tables and other platforms such as washing basins; that can be used in cooperation with existing equipment such as grooming loops; that can be adjusted with one hand; that is easy to clean and does not attract animal hair, fur, dirt, blood, urine, or moisture; that has an elevation range suitable to treat small dogs or other animals; and that is of simple construction. Other advantages of one or more aspects will be apparent from a consideration of the ensuing description and accompanying drawings.

SUMMARY OF THE INVENTION

In accordance with one embodiment, an animal supporting device or block with unequal dimensions or edge lengths such that the device's orientation can be changed in order to provide support to dogs of different heights, said device having one or more ends with a generally trough-shaped channel that provides an alternative support surface at a different support elevation. Other embodiments are described and shown.

Figure 1:
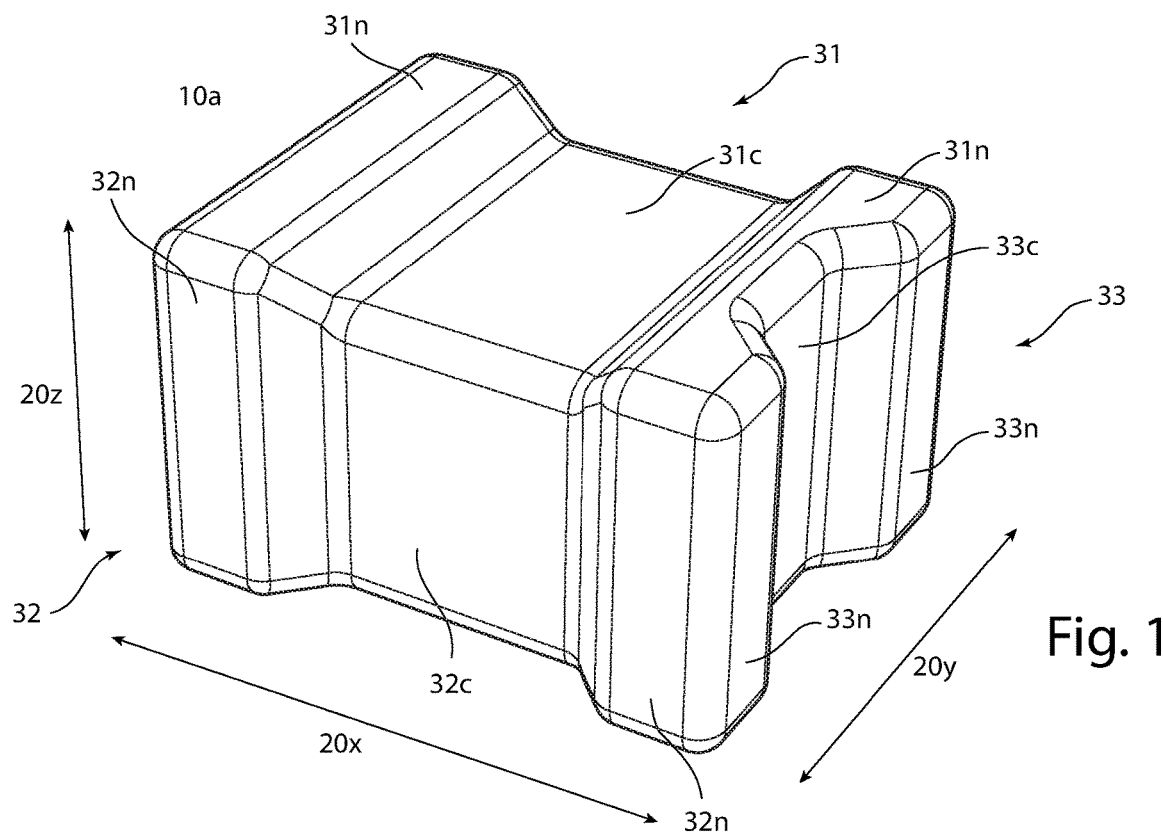

| DRAWINGS-REFERENCE NUMERALS | | | |
|---|---|---|---|
| 10a | supporting device | 10b | second embodiment of supporting device |
| 20x | primary dimension AX | 20y | primary dimension AY |
| 20z | primary dimension AZ | 31 | end A1 |
| 31c | channel portion of end A1 | 31n | non-channel portion of end A1 |
| 32 | end A2 | 32c | channel portion of end A2 |
| 32n | non-channel portion of end A2 | 33 | end A3 |
| 33c | channel portion of end A3 | 33n | non-channel portion of end A3 |
| 34 | end A4 | 35 | end A5 |
| 36 | end A6 | 40x | primary dimension BX |
| 40y | primary dimension BY | 40z | primary dimension BZ |
| 51 | end B1 | 52 | end B2 |
| 52c | channel portion of end B2 | 52n | non-channel portion of end B2 |
| 53 | end B3 | 53c | channel portion of end B3 |
| 53n | non-channel portion of end B3 | 54 | end B4 |
| 55 | end B5 | 55c | channel portion of end B5 |
| 55n | non-channel portion of end B5 | 56 | end B6 |
| 56c | channel portion of end B6 | 56n | non-channel portion of end B6 |
| 99 | dog | 99a | alternative-size dog |
| 99b | alternative-size dog | 99c | alternative-size dog |
| 99d | alternative-size dog | 99e | alternative-size dog |

DRAWINGS—FIGURES

FIG. 1 is a perspective view of the top of one embodiment of an animal supporting device.

Figure 2:
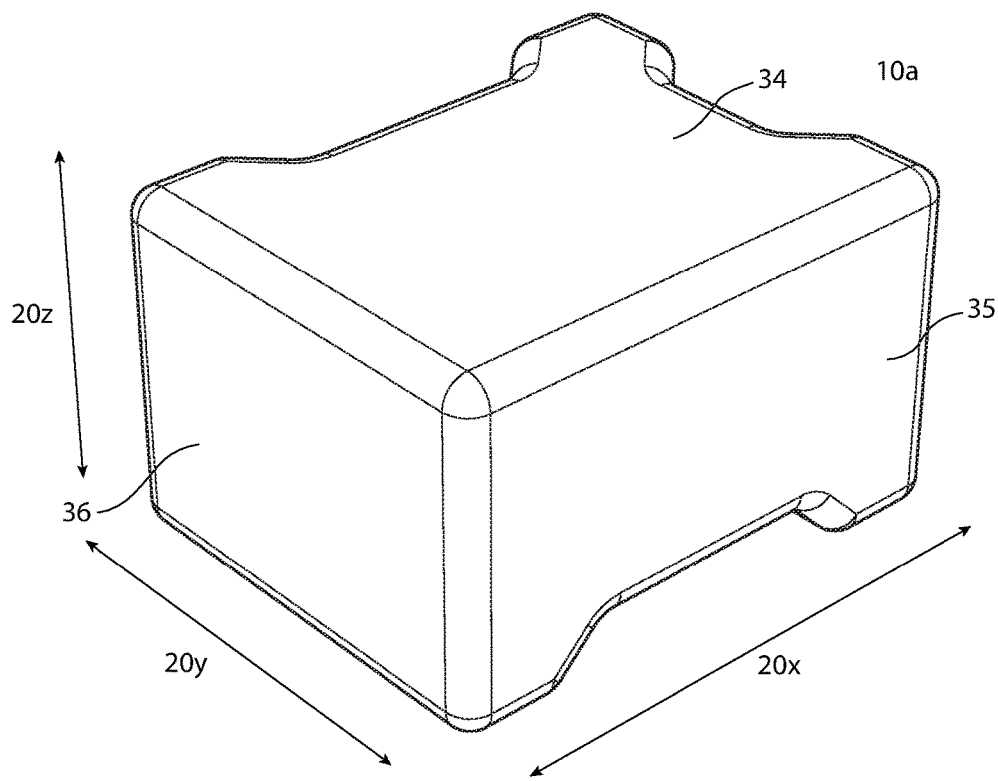

FIG. 2 is a perspective view of the bottom of the embodiment of FIG. 1.

Figure 3A:
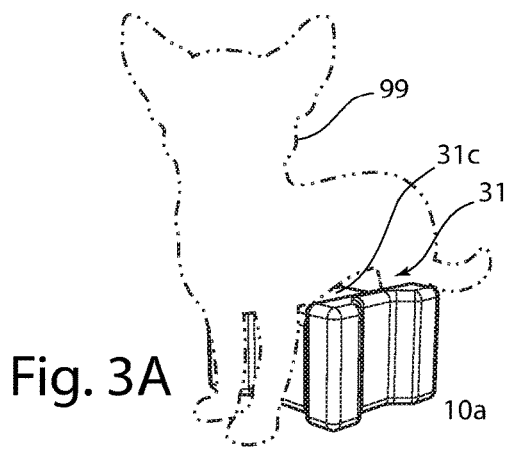

FIG. 3A is a perspective view of the embodiment of FIGS. 1 and 2 placed beneath a dog in a first orientation.

Figure 3B:
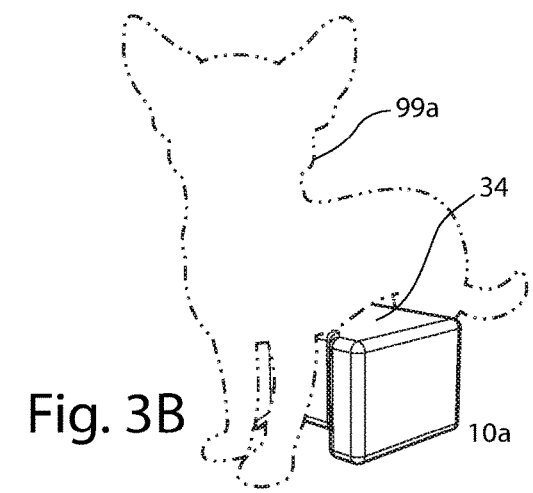

FIG. 3B is a perspective view of the embodiment of FIGS. 1 and 2 placed beneath a dog in a second orientation.

Figure 3C:
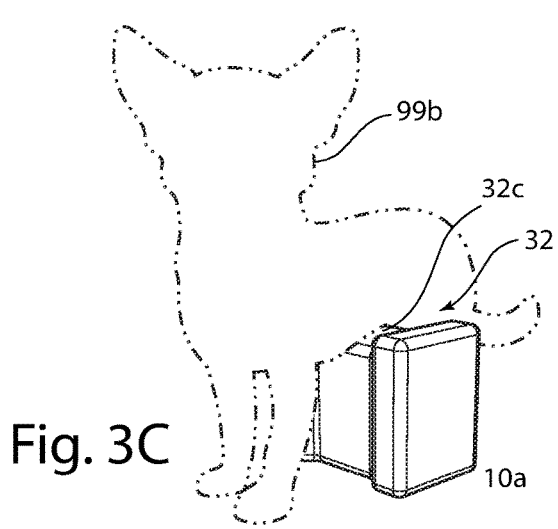

FIG. 3C is a perspective view of the embodiment of FIGS. 1 and 2 placed beneath a dog in a third orientation.

Figure 3D:
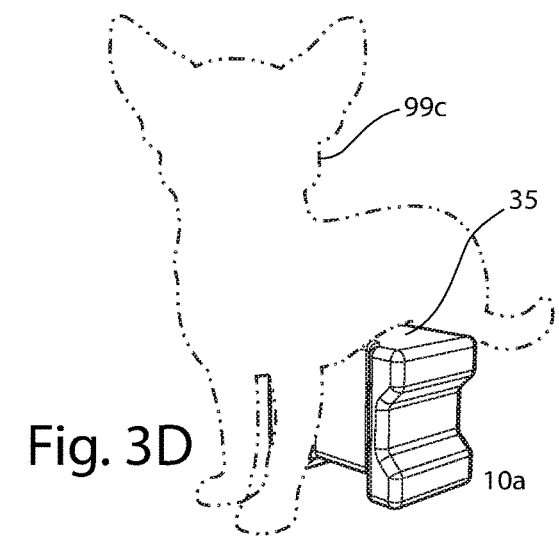

FIG. 3D is a perspective view of the embodiment of FIGS. 1 and 2 placed beneath a dog in a fourth orientation.

Figure 3E:
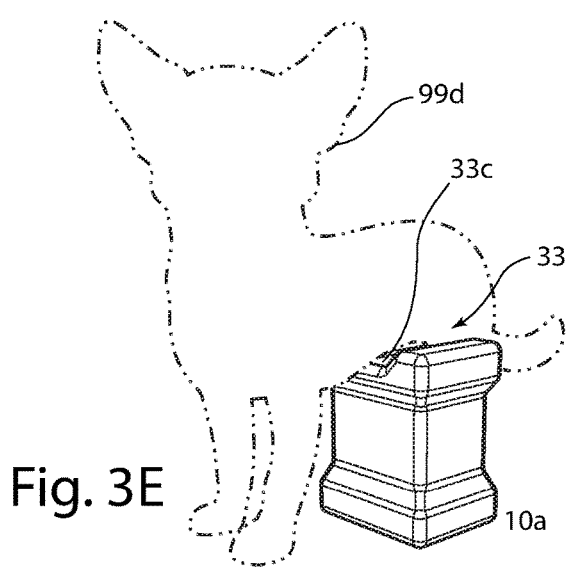

FIG. 3E is a perspective view of the embodiment of FIGS. 1 and 2 placed beneath a dog in a fifth orientation.

Figure 3F:
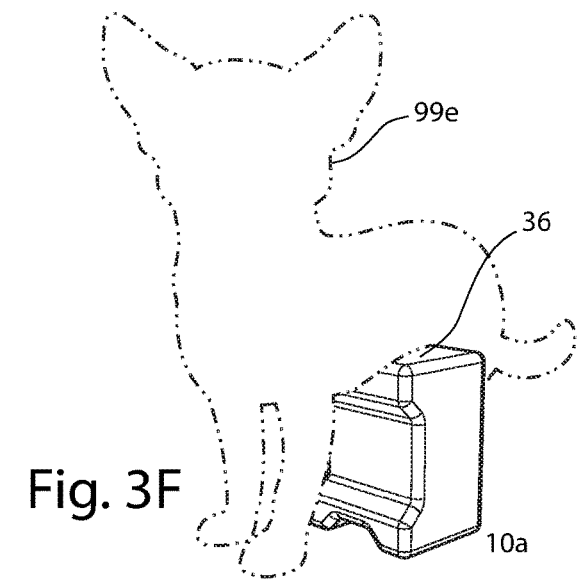

FIG. 3F is a perspective view of the embodiment of FIGS. 1 and 2 placed beneath a dog in a sixth orientation.

Figure 4:
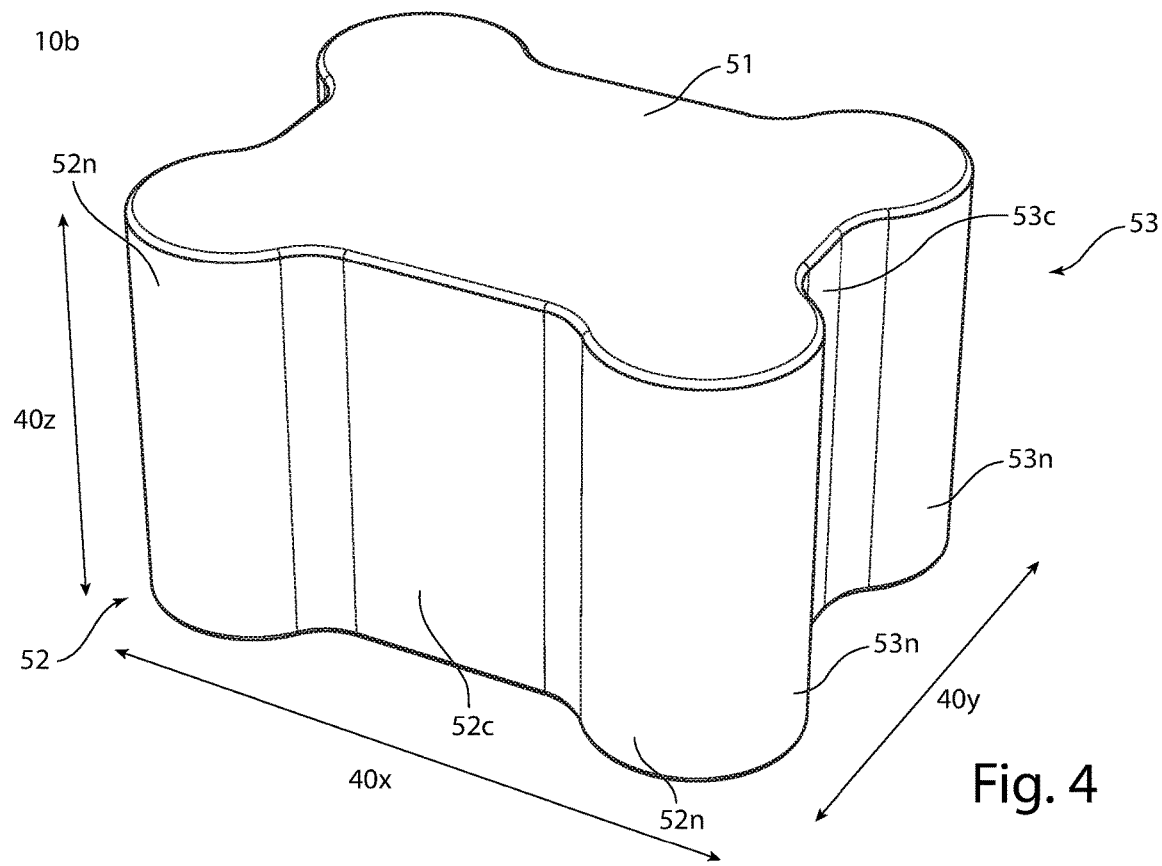

FIG. 4 is a perspective view of a second embodiment of an animal supporting device.

Figure 5:
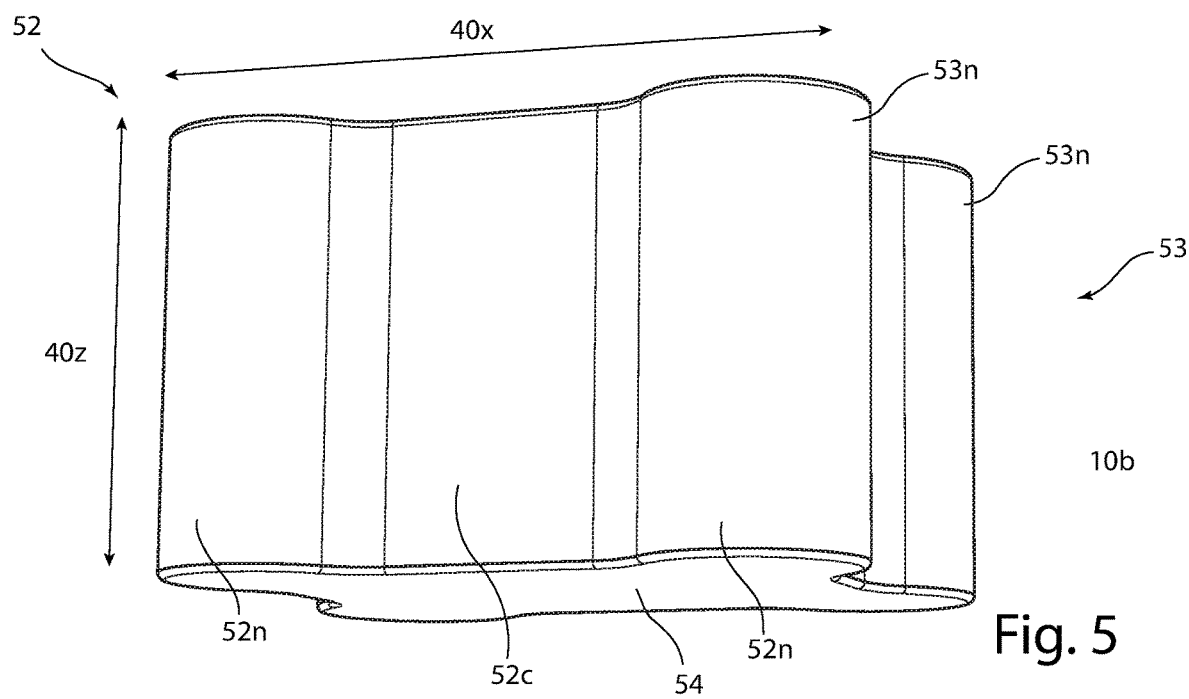

FIG. 5 is a perspective view of one end of the embodiment of FIG. 4.

Figure 6:
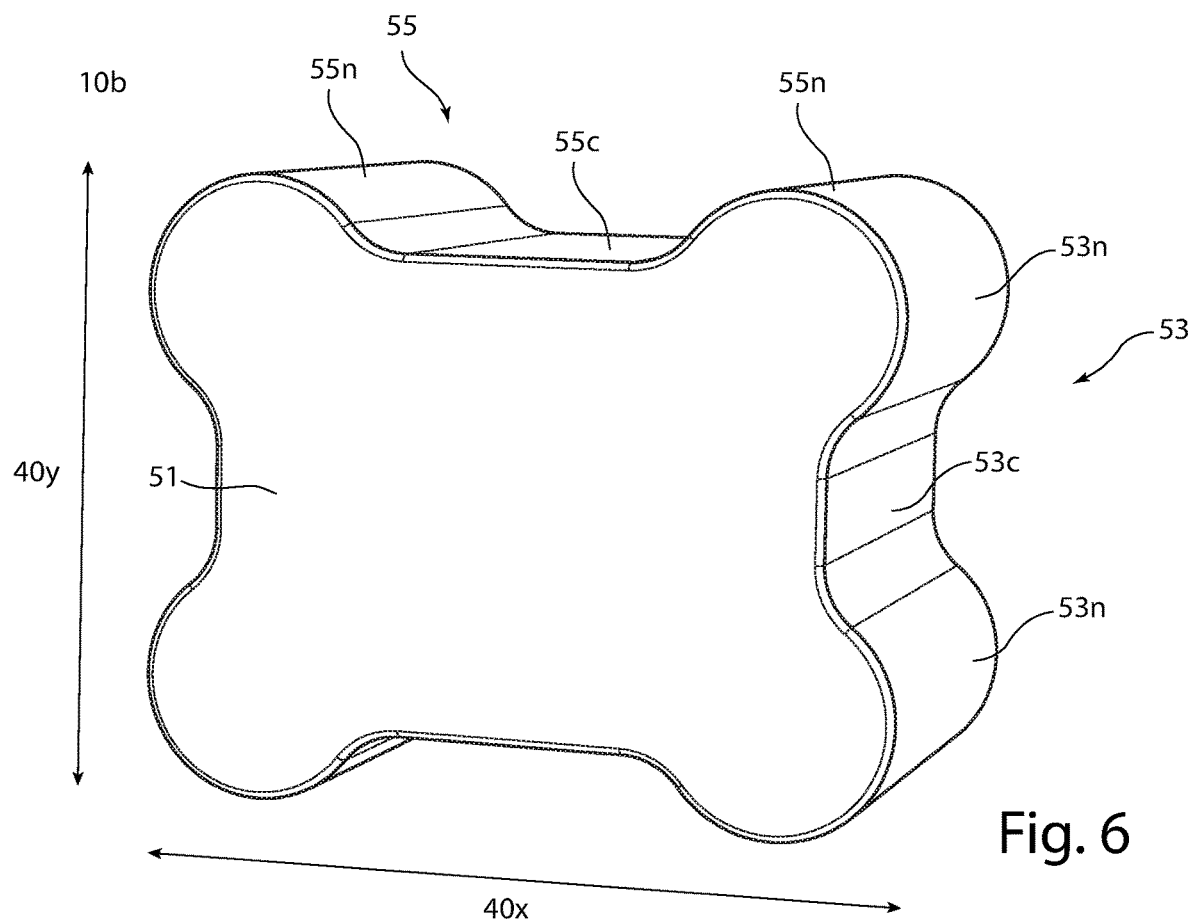
Figure 7:
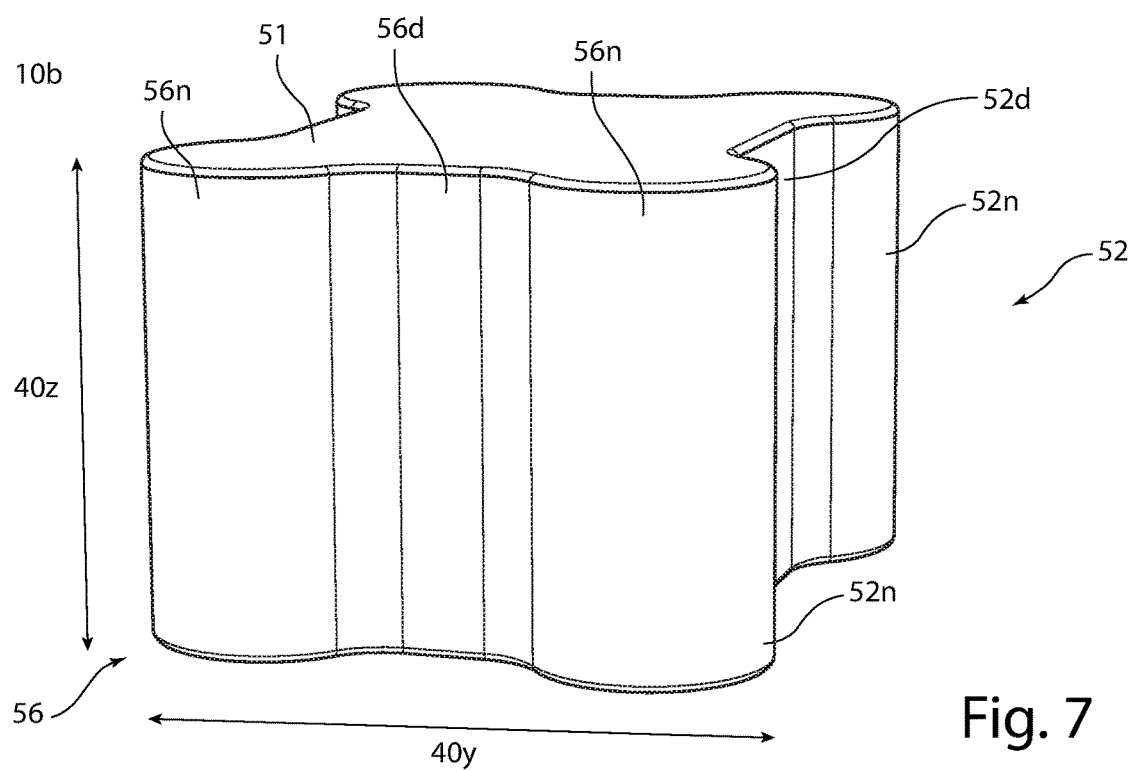
FIG. 7 is a perspective view of a third end of the embodiment of FIGS. 4, 5 and 6.

FIG. 6 is a perspective view of a second end of the embodiment of FIGS. 4 and 5.

DETAILED DESCRIPTION

The term "dog-bone shape" is used herein, in a broad lay sense, to mean an exact dog-bone shape or an approximate dog-bone shape with gibbous-shaped corners within some tolerance.

The term "animal" is used herein to mean a quadruped animal such as a dog or cat.

The terms "opposite," "opposed," and "opposing" are used herein, in a broad lay sense, to describe or represent the general physical position being in a corresponding location on the other end, side, or edge.

The term "parallel" is used herein, in a broad lay sense, to mean exactly parallel or approximately parallel within some tolerance from exactly parallel.

The term "perpendicular" is used herein, in a broad lay sense, to mean exactly perpendicular or approximately perpendicular within some tolerance from exactly perpendicular.

First Embodiment—FIGS. 1, 2

FIGS. 1 and 2 (perspective views of first embodiment of device) show one embodiment of a supporting device or block 10a having exterior surfaces or ends A1 31, A2 32, A3 33, A4 34, A5 35, and A6 36. End A1 31 is opposite and generally parallel to end A4 34, end A2 32 is opposite and generally parallel to end A5 35, and end A3 33 is opposite and generally parallel to end A6 36. In further detail, block 10a is of generally rectangular construction and has three primary dimensions of unequal lengths: dimension AX 20x, dimension AY 20y, and dimension AZ 20z; such that when block 10a is rotated about its primary axes, the height of its uppermost end is varied such that it can support the abdomen or any other body part of a dog or other animal at different elevations or support heights.

In some embodiments, end A1 31 may have a generally trough-shaped depression or channel, creating a channel portion 31c at the center of end A1 31 and non-channel portions 31n along two opposed perimeter edges of end A1 31. When positioned as the uppermost end of block 10a, the channel portion of end A1 31c can engage the abdomen or any other body part of an animal at an effective elevation less than the non-channel portion s of end A1 31n (less than dimension AZ 20z) when the channel is aligned with the animal's torso, such that it acts as a saddle. In some embodiments, end A4 34 is flat, but in other embodiments, it may also have a channel.

Similarly, in some embodiments, end A2 32 may have a channel, creating a channel portion 32c at the center of end A2 32 and non-channel portions 32n along two opposed perimeter edges of end A2 32. When positioned as the uppermost end of block 10a, the channel portion of end A2 32c can engage the abdomen or any other body part of an animal at an elevation less than the non-channel portions of end A2 32n (less than dimension AY 20y) and more than the non-channel portions of end A1 31n (more than dimension AZ 20z) when the channel is aligned with the animal's torso, such that it acts as a saddle. In some embodiments, end A5 35 is flat, but in other embodiments, it may also have a channel.

Similarly, in some embodiments, end A3 33 may have a channel, creating a channel portion 33c at the center of end A3 33 and non-channel portions 33n along two opposed perimeter edges of end A3 33. When positioned as the uppermost end of block 10a, the channel portion of end A3 33c can engage the abdomen or any other body part of an animal at an elevation less than the non-channel portions of end A3 33n (less than dimension AX 20x) and more than the non-channel portions of end A2 32n (more than dimension AY 20y) when the channel is aligned with the animal's torso, such that it acts as a saddle. In some embodiments, end A6 36 is flat, but in other embodiments, it may also have a channel.

Still referring to FIGS. 1 and 2, the overall dimensions of block 10a can vary depending on the range of dog or animal sizes for which the embodiment of block 10a is intended to accommodate. In some embodiments, the length intervals between dimension AX 20x, dimension AY 20y, and dimension AZ 20z are generally regular or consistent. In some embodiments, the channel depth (the difference in elevation between the channel portion and the non-channel portions) of a given end may be between about one-third to about two-thirds of the length interval in order to provide consistent and finer elevation increments.

In further detail, in some embodiments, such as the one shown in FIGS. 1 and 2 where only one of each pair of opposed ends has a channel (or where opposed ends have channels of equivalent channel depths), which provides two effective elevations per pair of opposed ends (and up to six effective elevations per block), the channel depth may be about one-half of the length interval such that the elevation increments for all of the block orientations are consistently about one-half of the length interval. In such embodiments, length intervals of about 1 inch or less may be used for the overall block dimensions to provide sufficiently small elevation increments of about ½ inch or less, but other length interval values can be used. As an example, for an embodiment such as that shown in FIGS. 1 and 2 and intended for very small dogs such as Yorkshire Terriers, Chihuahuas, puppies, and toy breeds, dimension AX 20x can be about 5¼ inches, dimension AY 20y can be about 4¼ inches, and dimension AZ 20z can be about 3¼ inches, which represents a length interval of about 1 inch; the channel depth can be about ½ inch, which provides six effective elevations ranging from about 2¾ inches to about 5¼ inches at consistent support increments of about ½ inch, allowing it to accommodate various sizes of very small dogs with a single device, although other dimensions, intervals, and channel depths can be used.

In other embodiments where opposed ends have channels of non-equivalent channel depths, which provides three effective elevations per pair of opposed ends (and up to nine effective elevations per block), the channel depths may be about one-third and two-thirds of the length interval, respectively, such that the elevation increments for all of the block orientations are consistently about one-third of the length interval. In such embodiments, larger length intervals of about 1½ inches or less may be used for the overall block dimensions to provide sufficiently small elevation increments of about ½ inch or less, but other length interval values can be used.

In some embodiments, block 10a can be made of a semi-rigid material such as high-density cross-linked polyethylene foam, plastic, or wood in order to provide adequate mass and strength to stably support the weight of an animal while being treated, but other materials can also be used. In some embodiments, block 10a can be constructed using conventional and simple manufacturing operations, such as 3D printing, water-jet cutting, or CNC routing, but other conventional and non-conventional manufacturing operations such as extruding, injection molding, etc. can also be used. In some embodiments, block 10a can be coated with polyurea, polyurethane, or epoxy to provide a durable and easy-to-clean surface that does not attract animal hair, fur, dirt, or fluids, but other coatings or surface treatments (or no coating or surface treatment) can be used.

Operation of First Embodiment—FIGS. 3A, 3B, 3C, 3D, 3E, 3F FIGS. 3A-3F (first embodiment of device supporting a dog) shows one embodiment of the supporting device or block 10a positioned in various orientations beneath dogs 99-99e of different sizes; however, other animals can also be supported. Dog 99 (or 99a-99e) and block 10a may be placed on an elevated surface (not shown) including without limitation a grooming table, a veterinary table, or a washing basin, such that a groomer, veterinarian, breeder, or other animal caretaker can be in a comfortable standing or sitting position as they treat the animal, but other surfaces can also be used. Block 10a is standalone and portable such that it can be placed or removed from beneath dog 99 (or 99a-99e) as required, without requiring installation or uninstallation. Minor adjustments can also be made to the placement of block 10a while it is being used in order to accommodate changes in the posture or position of dog 99 (or 99a-99e). In some embodiments, block 10a can be used in cooperation with existing tools and equipment including without limitation grooming loops (not shown). In some embodiments, block 10a can be used to support standing animals that tend to sit during treatment or animals that are injured, disabled, or elderly; however, block 10a can also be used for other purposes. In some embodiments, using block 10a during the treatment or care of an animal can free the user's hand for use in other tasks, reduce fatigue and injury to the hand, wrist, and arm, and reduce the time required to perform the treatment or care. In some embodiments, using block 10a can also reduce fatigue, strain, or pain for the animal being supported.

Still referring to FIGS. 3A-3F, the elevation or support height of block 10a can be adjusted with one hand by rotating block 10a about its primary axes until the uppermost end of block 10a is at an appropriate elevation to engage the abdomen or other body part of dog 99 (or 99a-99e), thereby allowing a single block 10a to accommodate different sized dogs or other animals. When ends with channels are positioned as the uppermost end of block 10a, the channel may be aligned parallel with the animal's torso, such that it acts as a saddle, and the channel portion will dictate the effective elevation of block 10a. Alternatively, if the channel is aligned perpendicular to the animal's torso, the non-channel portion will dictate the effective elevation of block 10a (the same effective elevation as an opposing end without a channel).

FIG. 3A shows block 10a positioned in its first and shortest-elevation orientation with end A1 31 as the upper end of block 10a. Here, the channel portion of end A1 31c is aligned with the dog's torso and can engage the abdomen of dog 99 at an effective elevation less than dimension AZ 20z.

FIG. 3B shows block 10a positioned in its second orientation with end A4 34 as the upper end of block 10a. Here, end A4 34 has no channel and can engage the abdomen of dog 99a at an elevation of dimension AZ 20z.

FIG. 3C shows block 10a positioned in its third orientation with end A2 32 as the upper end of block 10a. Here, the channel portion of end A2 32c is aligned with the dog's torso and can engage the abdomen of dog 99b at an effective elevation less than dimension AY 20y.

FIG. 3D shows block 10a positioned in its fourth orientation with end A5 35 as the upper end of block 10a. Here, end A5 35 has no channel and can engage the abdomen of dog 99c at an elevation of dimension AY 20y.

FIG. 3E shows block 10a positioned in its fifth orientation with end A3 33 as the upper end of block 10a. Here, the channel portion of end A3 33c is aligned with the dog's torso and can engage the abdomen of dog 99d at an effective elevation less than dimension AX 20x.

FIG. 3F shows block 10a positioned in its sixth and tallest-elevation orientation with end A6 36 as the upper end of block 10a. Here, end A6 36 has no channel and can engage the abdomen of dog 99e at an elevation of dimension AX 20x.

Second Embodiment—FIGS. 4, 5, 6, 7

Referring now to FIGS. 4-7 (perspective views of second embodiment), there is shown a second embodiment of a supporting device or block 10b having exterior surfaces or ends B1 51, B2 52, B3 53, B4 54, B5 55, and B6 56. End B1 51 is opposite and generally parallel to end B4 54, end B2 52 is opposite and generally parallel to end B5 55, and end B3 53 is opposite and generally parallel to end B6 56. In further detail, block 10b is of generally rectangular construction and has three primary dimensions of unequal lengths: dimension BX 40x, dimension BY 40y, and dimension BZ 40z; such that when block 10b is rotated about its primary axes, the height of its uppermost end is varied such that it can support the abdomen or any other body part of a dog or other animal at different elevations or support heights.

In further detail, in some embodiments, ends B1 51 and B4 54 may have a generally dog-bone-shaped outline or profile, but other ends can have a similarly shaped profile, and other suitable shapes can also be used. The dog-bone-shaped profile provides generally trough-shaped depressions or channels on the adjacent side ends B2 52, B3 53, B5 55, and B6 56 extending between ends B1 51 and B4 54, where the channels correspond to the concave edges of the dog-bone-shaped profile. On end B2 52, a channel portion 52c corresponds to the adjacent concave edges of ends B1 51 and B4 54, and non-channel portions 52n correspond to the adjacent convex edges of ends B1 51 and B4 54. Similarly, on end B5 55, a channel portion 55c corresponds to the adjacent concave edges of ends B1 51 and B4 54, and non-channel portions 55n correspond to the adjacent convex edges of ends B1 51 and B4 54. When positioned as the uppermost end of block 10b, the channel portions of end B2 52c and end B5 55c can engage the abdomen or any other body part of an animal at an effective elevation less than the non-channel portions of end B2 52n and end B5 55n (less than dimension BY 40y) when the channels are aligned with the animal's torso, such that they act as saddles.

On end B3 53, a channel portion 53c corresponds to the adjacent concave edges of ends B1 51 and B4 54, and non-channel portions 53n correspond to the adjacent convex edges of ends B1 51 and B4 54. Similarly, on end B6 56, a channel portion 56c corresponds to the adjacent concave edges of ends B1 51 and B4 54, and non-channel portions 56n correspond to the adjacent convex edges of ends B1 51 and B4 54. When positioned as the uppermost end of block 10b, the channel portions of end B3 53c and end B6 56c can engage the abdomen or any other body part of an animal at an effective elevation less than the non-channel portions of end B3 53n and end B6 56n (less than dimension BX 40x) when the channels are aligned with the animal's torso, such that they act as saddles.

Still referring to FIGS. 4-7, the overall dimensions of block 10b can vary depending on the range of dog or animal sizes for which the embodiment of block 10b is intended to accommodate. In some embodiments, the length intervals between dimension BX 40x, dimension BY 40y, and dimension BZ 40z are generally regular or consistent, but non-regular length intervals can be used. In some embodiments, the channel depth (the difference in elevation between the channel portion and the non-channel portion) of a given end may be between about one-third to about two-thirds of the length interval in order to provide consistent and finer elevation increments.

In further detail, in some embodiments where only one of each pair of opposed ends has a channel (or where opposed ends have channels of equivalent channel depths), which provides two effective elevations per pair of opposed ends (and up to six effective elevations per block), the channel depth may be about one-half of the length interval such that the elevation increments for all of the block orientations are consistently about one-half of the length interval. In such embodiments, length intervals of about 1 inch or less may be used for the overall block dimensions to provide sufficiently small elevation increments of about ½ inch or less, but other length interval values can be used. For example, for an embodiment such as that shown in FIGS. 4-7 and intended for very small dogs such as Yorkshire Terriers, Chihuahuas, puppies, and toy breeds, dimension BX 40x can be about 5¼ inches, dimension BY 40y can be about 4¼ inches, and dimension BZ 40z can be about 3¼ inches, which represents a length interval of about 1 inch; the channel depth can be about ½ inch, which provides five effective elevations ranging from about 3¼ inches to about 5¼ inches at consistent support increments of about ½ inch, although other dimensions, intervals, and channel depths can be used.

In other embodiments where opposed ends have channels of non-equivalent channel depths, which provides three effective elevations per pair of opposed ends (and up to nine effective elevations per block), the channel depths may be about one-third and two-thirds of the length interval, respectively, such that the elevation increments for all of the block orientations are consistently about one-third of the length interval. In such embodiments, larger length intervals of about 1½ inches or less may be used for the overall block dimensions to provide sufficiently small elevation increments of about ½ inch or less, but other length interval values can be used.

In some embodiments, block 10*b* can be made of a semi-rigid material such as high-density cross-linked polyethylene foam, plastic, or wood in order to provide adequate mass and strength to stably support the weight of an animal while being treated, but other materials can also be used. In some embodiments, block 10*b* can be constructed using conventional and simple manufacturing operations, such as 3D printing, water-jet cutting, or CNC routing, but other conventional and non-conventional manufacturing operations such as extruding, injection molding, etc. can also be used. In some embodiments, block 10*b* can be coated with polyurea, polyurethane, or epoxy to provide a durable and easy-to-clean surface that does not attract animal hair, fur, dirt, or fluids, but other coatings or surface treatments (or no coatings or surface treatments) can be used.

Operation of Second Embodiment—FIGS. 8A, 8B, 8C, 8D, 8E

FIGS. 8A-8E (second embodiment of device supporting a dog) shows one embodiment of the supporting device or block 10*b* positioned in various orientations beneath dogs 99*a*-99*e* of different sizes; however, other animals can also be supported. Dog 99*a* (or 99*b*-99*e*) and block 10*b* may be placed on an elevated surface (not shown) including without limitation a grooming table, a veterinary table, or a washing basin, such that a groomer, veterinarian, breeder, or other animal caretaker can be in a comfortable standing or sitting position as they treat the animal, but other surfaces can also be used. Block 10*b* is standalone and portable such that it can be placed or removed from beneath dog 99*a* (or 99*b*-99*e*) as required, without requiring installation or uninstallation. Minor adjustments can also be made to the placement of block 10*b* while it is being used in order to accommodate changes in the posture or position of dog 99*a* (or 99*b*-99*e*). In some embodiments, block 10*b* can be used in cooperation with existing tools and equipment including without limitation grooming loops (not shown). In some embodiments, block 10*b* can be used to support standing animals that tend to sit during treatment or animals that are injured, disabled, or elderly; however, block 10*b* can also be used for other purposes. In some embodiments, using block 10*b* during the treatment or care of an animal can free the user's hand for use in other tasks, reduce fatigue and injury to the hand, wrist, and arm, and reduce the time required to perform the treatment or care. In some embodiments, using block 10*b* can also reduce fatigue, strain, or pain for the animal being supported.

Still referring to FIGS. 8A-8E, the elevation or support height of block 10*b* can be adjusted with one hand by rotating block 10*b* about its primary axes until the uppermost end of block 10*b* is at an appropriate elevation to engage the abdomen or other body part of dog 99*a* (or 99*b*-99*e*), thereby allowing a single block 10*b* to accommodate different sized dogs or other animals. When ends with channels are positioned as the uppermost end of block 10*b*, the channel may be aligned parallel with the animal's torso, such that it acts as a saddle, and the channel portion will dictate the effective elevation of block 10*b*. Alternatively, if the channel is aligned perpendicular to the animal's torso, the non-channel portion will dictate the effective elevation of block 10*b*.

Figure 8A:
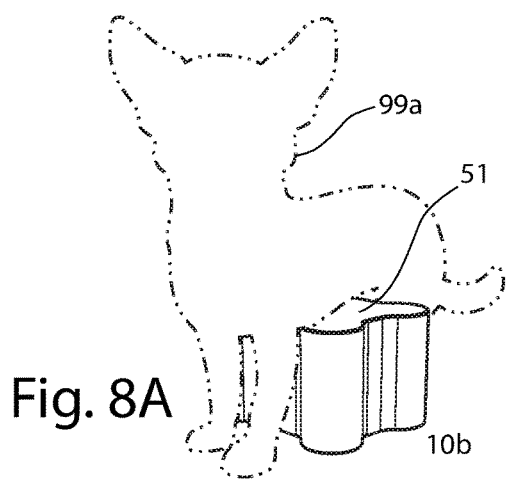
FIG. 8A is a perspective view of the embodiment of FIGS. 4, 5, 6 and 7 placed beneath a dog in a first orientation.

FIG. 8A shows block 10*a* positioned in its first and shortest-elevation orientation with end B1 51 as the upper end of block 10*b*. Here, end B1 51 has no channel and can engage the abdomen of dog 99*a* at an elevation of dimension BZ 40*z*. Block 10*b* would function similarly with end B4 54 as the upper end of block 10*b*.

Figure 8B:
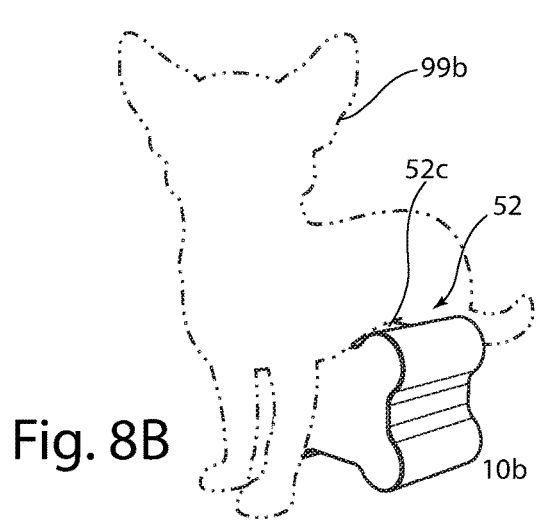
FIG. 8B is a perspective view of the embodiment of FIGS. 4, 5, 6 and 7 placed beneath a dog in a second orientation.

FIG. 8B shows block 10*b* positioned in its second orientation with end B2 52 as the upper end of block 10*b*. Here, the channel portion of end B2 52*c* is aligned with the dog's torso and can engage the abdomen of dog 99*b* at an effective elevation less than dimension BY 40*y*. Block 10*b* would function similarly with end B5 55 as the upper end of block 10*b*.

Figure 8C:
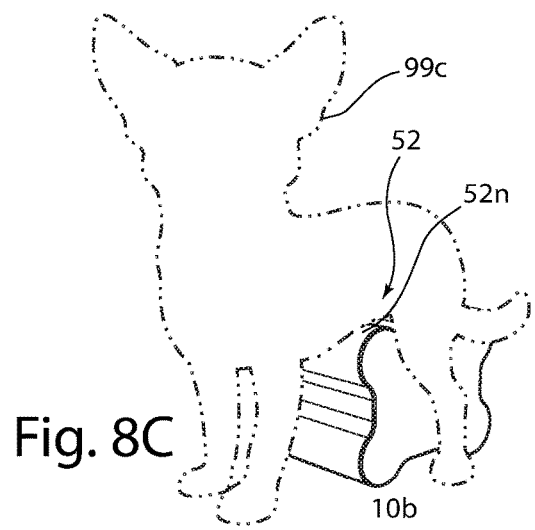
FIG. 8C is a perspective view of the embodiment of FIGS. 4, 5, 6 and 7 placed beneath a dog in a third orientation.

FIG. 8C shows block 10*b* positioned in its third orientation with end B2 52 as the upper end of block 10*b*. Here, the channel is not aligned with the dog's torso, and the non-channel portion of end B2 52*n* can engage the abdomen of dog 99*c* at an elevation of dimension BY 40*y*. Block 10*b* would function similarly with end B5 55 as the upper end of block 10*b*.

Figure 8D:
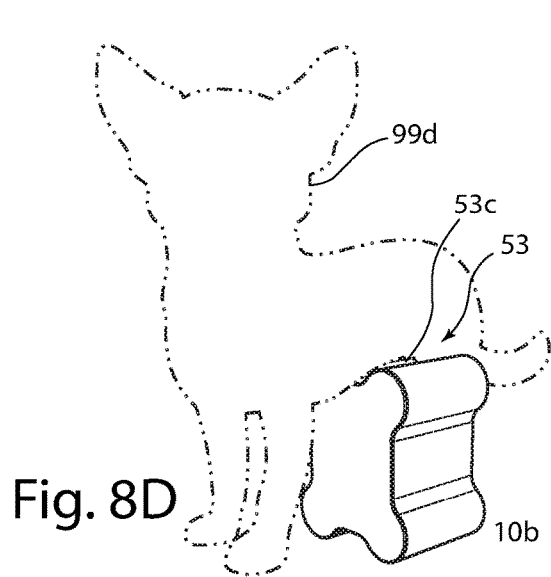
FIG. 8D is a perspective view of the embodiment of FIGS. 4, 5, 6 and 7 placed beneath a dog in a fourth orientation.

FIG. 8D shows block 10*b* positioned in its fourth orientation with end B3 53 as the upper end of block 10*b*. Here, the channel portion of end B3 53*c* is aligned with the dog's torso and can engage the abdomen of dog 99*d* at an effective elevation less than dimension BX 40*x*. Block 10*b* would function similarly with end B6 56 as the upper end of block 10*b*.

Figure 8E:
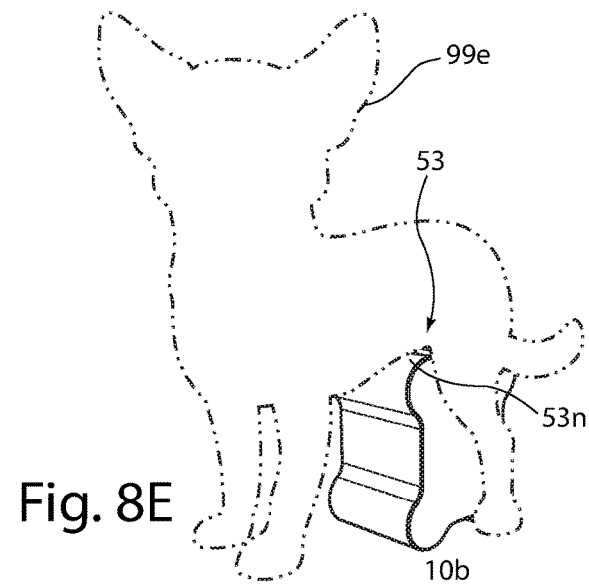
FIG. 8E is a perspective view of the embodiment of FIGS. 4, 5, 6 and 7 placed beneath a dog in a fifth orientation.

FIG. 8E shows block 10*b* positioned in its fifth and tallest-elevation orientation with end B3 53 as the upper end of block 10*b*. Here, the channel is not aligned with the dog's torso, and the non-channel portion of end B3 53*n* can engage the abdomen of dog 99*e* at an elevation of dimension BX 40*x*. Block 10*b* would function similarly with end B6 56 as the upper end of block 10*b*.

Advantages

From the description above, a number of advantages of one or more aspects of our supporting device become evident, without limitation:

a) The supporting device can support the abdomen or other body part of an animal, and it can support an injured, disabled, or elderly animal.

b) The supporting device can help prevent a standing animal from sitting or lying down while being treated.

c) The supporting device supports an animal so that pet owners, groomers, veterinarians, breeders, or other animal caretakers may not have to use one of their hands to support the animal, which can free their hand for use in other tasks, can reduce fatigue and injury to the hand, wrist, and arm, and can reduce the time required to perform the treatment or care.

d) The supporting device is exceedingly easy to adjust to accommodate various dog or other animal sizes by changing the orientation the device, and it can be made in various sizes to accommodate different ranges of dog or other animal sizes.

e) It is easy to make minor adjustments to the placement and effective elevation of the supporting device while it is being used in order to accommodate changes in the posture or position of the animal.

f) The supporting device is easy to move between its stowed location and the table or other work surface because it is relatively small and lightweight and does not need to be secured to the table.

g) The supporting device can be used on a variety of surfaces such as grooming tables, examination tables, or washing basins and can work in cooperation with existing tools and equipment, such as grooming loops.

h) The supporting device can be made of durable materials and/or coatings or surface treatments that are easy to clean and do not attract animal hair, fur, dirt, or fluids.

Conclusion and Scope

Accordingly, the reader will see that the various embodiments of the supporting device can adequately support a variety of animal sizes, can be simply and easily adjusted, can be quickly and easily positioned and repositioned under an animal or removed as needed, can be used on a variety of tables and other platforms such as washing basins, can be used to facilitate animal treatment procedures such as grooming, bathing, breeding, and veterinary care, and can reduce the time required to perform the treatment or care.

While the foregoing written description of the embodiments enables one of ordinary skill to make and use what is considered presently to be the best mode thereof, those of ordinary skill will understand and appreciate the existence of variations, combinations, and equivalents of the specific embodiments, methods, and examples herein. The invention should therefore not be limited by the above described embodiments, methods, and examples, but by all embodiments and methods within the scope and spirit of the invention as claimed.

What is claimed is:

1. An animal supporting device comprising a block having a first end, an opposing second end, and first and second pairs of opposed side ends extending between said first and second ends; said block having three primary dimensions of unequal lengths at generally regular length intervals; said block further having a plurality of non-opposing ends with a generally trough-shaped channel creating a channel portion and non-channel portions, wherein each channel depth is between about one-third and about two-thirds of the regular length interval; whereby said block can be placed beneath an animal and oriented such that the non-channel portions of the ends can engage the abdomen or other body part of the animal at elevations corresponding to said primary dimensions when those ends are positioned as the uppermost end, and the channel portions of the ends can engage the abdomen or other body part of the animal at elevations less than those of the corresponding non-channel portions when those ends are positioned as the uppermost end and the channel portion aligns with the torso or body part of the animal, such that said block can provide various support heights.

2. A block as in claim 1, wherein at least one pair of opposed ends of said block has a generally dog-bone-shaped outline with gibbous-shaped corners.

3. A block as in claim 1, wherein each channel depth is approximately half of the regular length interval.

4. A block as in claim 1, wherein said regular length intervals are about one and one-half inches or less.

5. A block as in claim 1, wherein said block is of sufficient strength to support the weight of a small dog.

6. A block for the support of an animal comprising a first end, an opposing second end, and first and second pairs of opposed side ends extending between said first and second ends; said block having three primary dimensions of unequal lengths at generally regular length intervals; said block further having a plurality of non-opposing ends with a pair of raised opposed perimeter edges, wherein the height of each pair of raised opposed perimeter edges is between about one-third and about two-thirds of the regular length interval;

whereby said block can be placed beneath an animal and rotated about its three primary axes such that the uppermost end of said block engages the abdomen or other body part of the animal at various elevations in order to accommodate animals of different sizes.

7. A block as in claim 6, wherein at least one pair of opposed ends of said block has a generally dog-bone-shaped outline with gibbous-shaped corners.

8. A block as in claim 6, wherein said regular length intervals are about one and one-half inches or less.

9. A block as in claim 6, wherein the height of each pair of raised opposed perimeter edges is approximately half of the regular length interval.

10. A block as in claim 6, wherein said block is of sufficient strength to support the weight of a small dog.

11. A method of supporting an animal during grooming, veterinary care, breeding, or bathing comprising:
a) providing a supporting device on a substantially level platform, the supporting device comprising a block having a first end, an opposing second end, and first and second pairs of opposed side ends extending between said first and second ends; said block further having three primary dimensions of unequal lengths at generally regular length intervals; said block further having a plurality of non-opposing ends with a generally trough-shaped channel, wherein each channel depth is between about one-third and about two-thirds of the regular length interval;
b) placing said block beneath an animal on said platform; and
c) rotating said block about its primary axes such that the uppermost end of said block is at an appropriate elevation and orientation to engage the abdomen or other body part of the animal.

12. A method of supporting an animal as in claim 11, wherein at least one pair of opposed ends of said block has a generally dog-bone-shaped outline with gibbous-shaped corners.

13. A method of supporting an animal as in claim 11, wherein each channel depth is approximately half of the regular length interval.

14. A method of supporting an animal as in claim 11, wherein said regular length intervals are about one and one-half inches or less.

15. A method of supporting an animal as in claim 11, wherein said block is of sufficient strength to support the weight of a small dog.

16. A method of supporting an animal as in claim 11, wherein said platform is a grooming table, a veterinary examination table, or a basin.

* * * * *